(12) United States Patent
Ikeda

(10) Patent No.: US 8,577,653 B2
(45) Date of Patent: Nov. 5, 2013

(54) OPTIMIZATION PROCESSING METHOD AND APPARATUS

(75) Inventor: Hiroshi Ikeda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 298 days.

(21) Appl. No.: 13/239,656

(22) Filed: Sep. 22, 2011

(65) Prior Publication Data

US 2012/0150500 A1    Jun. 14, 2012

(30) Foreign Application Priority Data

Dec. 8, 2010    (JP) ................................. 2010-273201

(51) Int. Cl.
    *G06G 7/48*    (2006.01)
(52) U.S. Cl.
    USPC ................................. 703/6; 706/19
(58) Field of Classification Search
    USPC ......... 703/2, 6, 8; 706/19; 335/306; 700/104; 716/2; 455/517
    See application file for complete search history.

(56) References Cited

U.S. PATENT DOCUMENTS

| 2007/0179919 A1* | 8/2007 | Kropaczek et al. | 706/19 |
| 2008/0072183 A1* | 3/2008 | Hershenson et al. | 716/2 |
| 2009/0326881 A1* | 12/2009 | Anai et al. | 703/2 |
| 2010/0057410 A1* | 3/2010 | Yanami et al. | 703/2 |
| 2010/0305925 A1* | 12/2010 | Sendhoff et al. | 703/8 |
| 2011/0098837 A1* | 4/2011 | Yucel et al. | 700/104 |
| 2011/0175694 A1* | 7/2011 | Fallone et al. | 335/306 |
| 2011/0256899 A1* | 10/2011 | Khazei | 455/517 |

FOREIGN PATENT DOCUMENTS

| JP | 9-325983 A | 12/1997 |
| JP | 2001-243268 A | 9/2001 |
| JP | 2004-118719 A | 4/2004 |
| JP | 2006-293483 A | 10/2006 |

* cited by examiner

*Primary Examiner* — Kandasamy Thangavelu
(74) *Attorney, Agent, or Firm* — Fujitsu Patent Center

(57) ABSTRACT

Upon detecting that a point that satisfies a predetermined condition and whose distance from a reference point is shorter than a distance from the reference point to a first point obtained by searching a parameter space based on values of a first search indicator under a first constraint exists in the parameter space, a second point is calculated under the first constraint in the parameter space by a search method other than the searching using the first search indicator. Then, generating a second search indicator represented by a first linear combination of at least certain of first search indicators so as to obtain the second point or an adjacent point of the second point, when searching by using the second search indicator or generating a second search indicator so that search is carried out in a direction of the second point when using the second search indicator is carried out.

10 Claims, 19 Drawing Sheets

OPTIMIZATION PROCESSING METHOD AND APPARATUS

CROSS-REFERENCE TO RELATED APPLICATIONS

This application is based upon and claims the benefit of priority of the prior Japanese Patent Application No. 2010-273201, filed on Dec. 8, 2010, the entire contents of which are incorporated herein by reference.

FIELD

This technique relates to a technique for optimizing parameters.

BACKGROUND

For example, a problem is considered, in which a design parameter space is searched to obtain coordinates of a point that represents inferiority (hereinafter, referred to NG) and is nearest to the design center. For instance, as schematically depicted in FIG. 1, in the design parameter space mapped by the design parameters X1 and X2, the search starts from the design center that is set at the origin. In the search, an indicator representing goodness or badness of the design is prepared, and values of the indicator are calculated by the simulation. More specifically, the search was carried out by a method such as steepest descent method using the change of the indicator value when changing the values of the design parameters. In FIG. 1, the indicator values and their contour lines are schematically illustrated, and a portion whose indicator value is equal to or less than "0" corresponds to an NG area. As illustrated by an arrow, the search is carried out along a route whose inclination of the indicator value is greatest, and when the search reaches an NG point that is nearest to the design center (point represented by a circle), the search is completed.

However, there is a case where the indicator representing the goodness or badness of the design is not calculated as a continuous numerical value but is obtained only as success (OK) or failure (NG). For example, there is a case where only a judgment indicator exists such a judgment indicator representing data can be written or cannot be written to a Statistic Random Access Memory (SRAM) or judgment indicator representing a robot can stand up or cannot stand up. In such a case, when the number of design parameters is lesser, or when the search range is narrow, it is possible to identify a boundary between an area in which OK (e.g. judgment indicator=1) is determined and an area in which NG (e.g. judgment indicator=0) is determined, by searching thoroughly, as schematically illustrated in FIG. 2. However, when the number of design parameters is greater and the search range is broader, it is difficult to obtain the coordinates of the NG point that is nearest to the design center, by using such a method.

Then, it is considered that a search indicator to search the design parameter space is introduced in addition to the judgment indicator. The search indicator represents goodness or badness of the design at an arbitrary point in the design parameter space, and according to this search indicator, it is possible to determine the relative goodness or badness of the designs at two points. Therefore, it is also possible to carry out the search by using the steepest descent method or the like using this search indicator. However, the boundary between OK and NG by the search indicator and the boundary between OK and NG by the judgment indicator are not always identical. Then, the result of the search by the search indicator may not correspond to an NG point that is nearest to the design center. Furthermore, there is a case where only a local optimal solution can be obtained by the search using the steepest descent method or the like using the search indicator.

Incidentally, a technique exists to surely obtain trade-off information which exists between optimality and robustness by increasing the efficiency of time and labor to obtain a robust optimum solution, with which a designer is satisfied. Specifically, when an average value and a standard deviation of an inputted objective function are set as plural new independent multi-objective functions and also plural design candidates are generated based on the inputted initial values, a dominance indicator, which represents an evaluation result of the robust optimum solution, is calculated using an average and a standard deviation of sample points generated in the vicinity of each of design candidates, and the new design candidates are repetitively generated by replacing existing design candidates, while prioritizing the design candidate having a good dominance indicator. Therefore, it becomes possible to calculate plural robust optimum solutions by one optimization calculation, and to simply and efficiently find perspective of the trade-off information between the optimality and robustness of the objective functions by remarkably shortening calculation time required for calculating all the optimum solutions. However, the application of this method to the steepest descent method is not considered. In addition, because the dominance indicator is calculated for each design candidate, extra calculation time is required.

SUMMARY

According to this technique, an optimization processing method includes: (A) upon detecting that a point that satisfies a predetermined condition and whose distance from a predetermined reference point is shorter than a distance from the predetermined reference point to a first point obtained by searching a parameter space based on values of a first search indicator registered in a search indicator storage unit under a first constraint exists in the parameter space, calculating a second point under the first constraint in the parameter space by a search method other than the searching using the first search indicator; and (B) carrying out a first processing comprising generating a second search indicator represented by a linear combination of at least certain of first search indicators so as to obtain the second point or an adjacent point of the second point, when search is carried out by using the second search indicator or generating a second search indicator represented by a linear combination of at least certain of first search indicators so that search is carried out in a direction of the second point when the second search indicator is used, and additionally registering the second search indicator into the search indicator storage unit.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Embodiment 1

Figure 1:
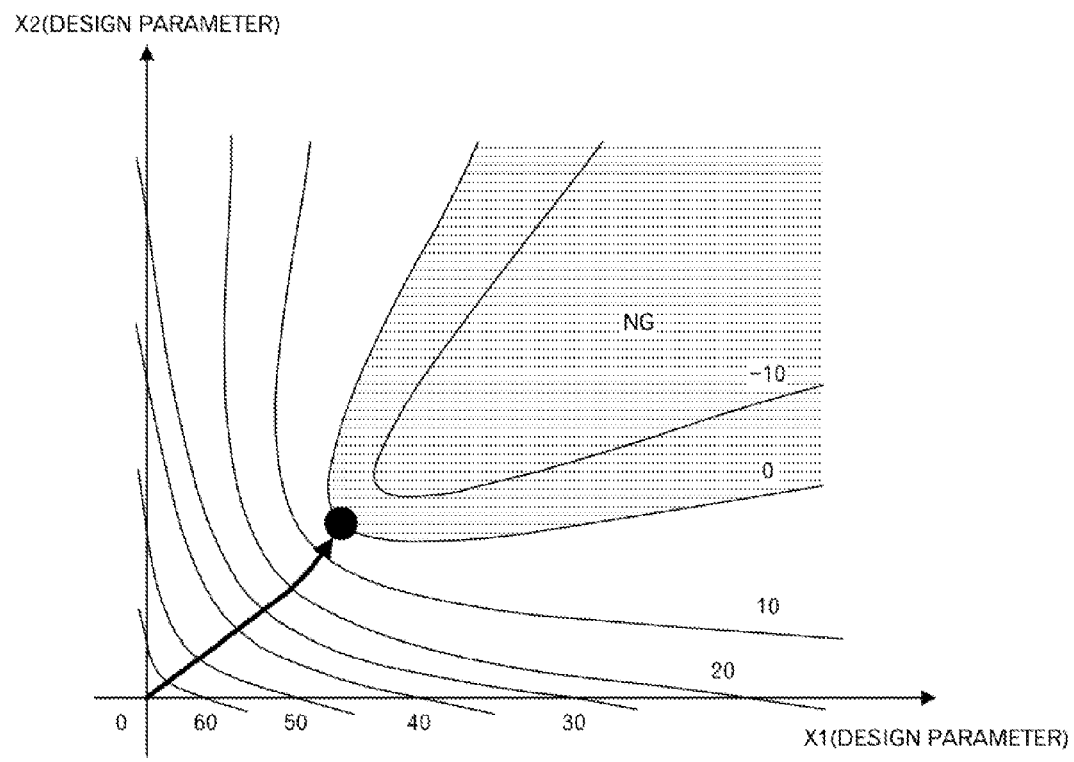
FIG. 1 is a schematical diagram to explain the steepest descent method.
Figure 2:
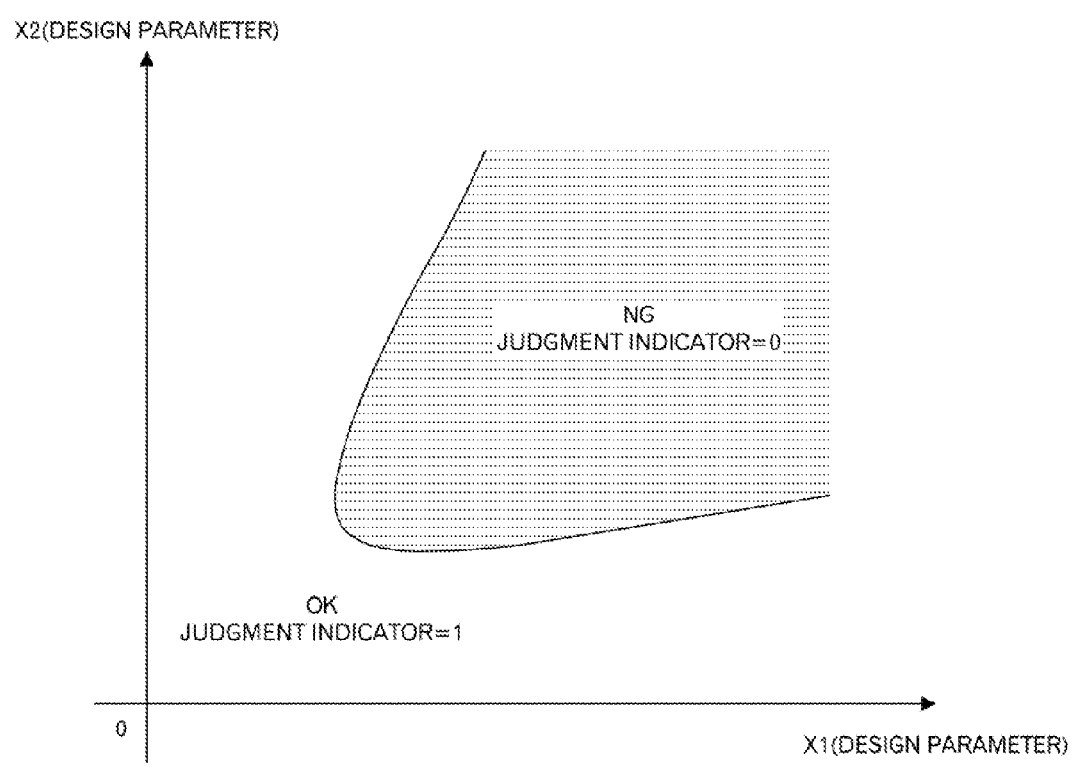
FIG. 2 is a schematical diagram to explain a judgment indicator.
Figure 3:
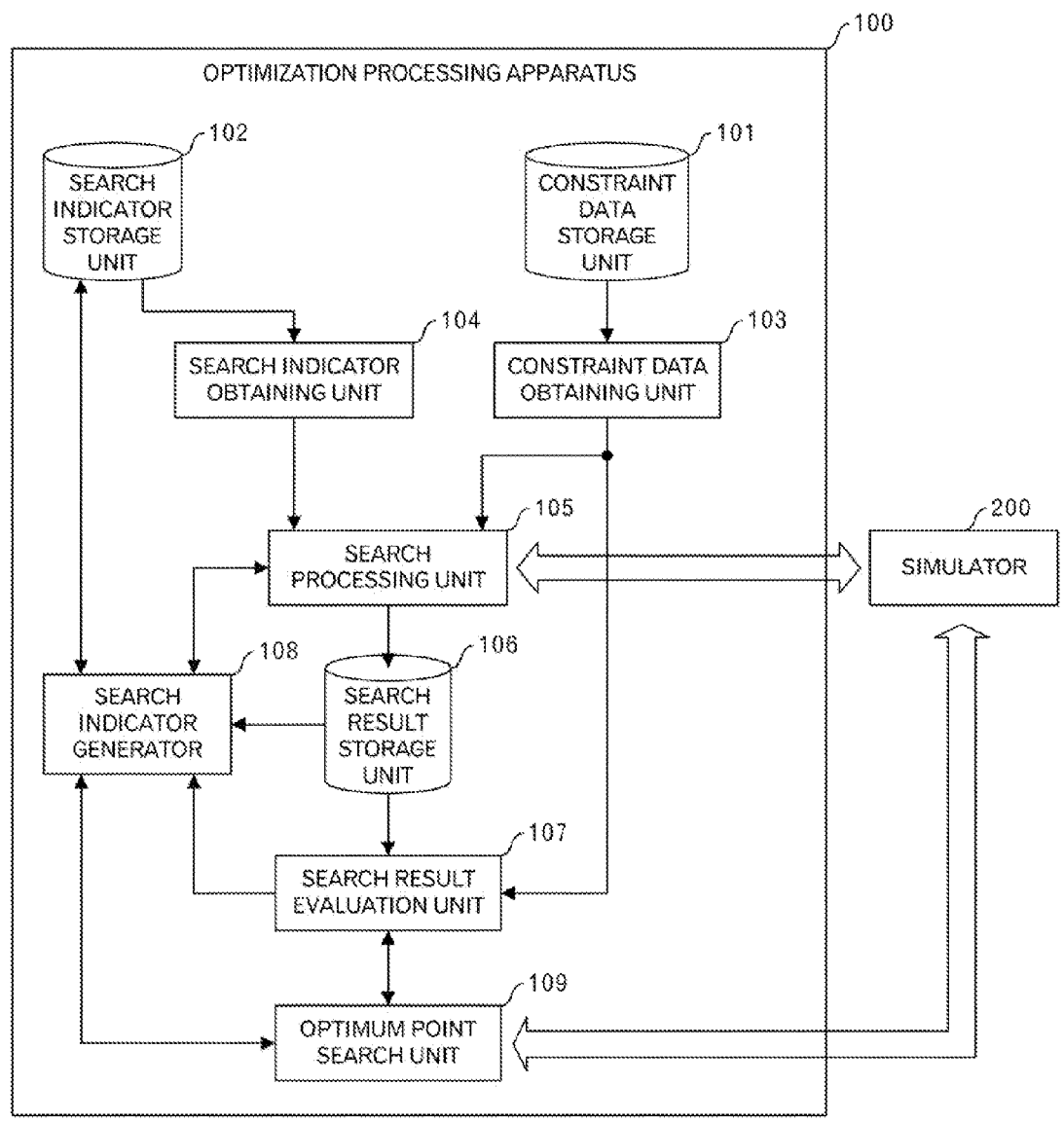
FIG. 3 is a functional block diagram of an optimization processing apparatus relating to an embodiment.

FIG. 3 illustrates a functional block diagram of an optimization processing apparatus relating to a first embodiment of this technique. The optimization processing apparatus 100 has a constraint data storage unit 101, search indicator storage unit 102, constraint data obtaining unit 103, search indicator obtaining unit 104, search processing unit 105, search result storage unit 106, search result evaluation unit 107, search indicator generator 108 and optimum point search unit 109. The optimization processing apparatus 100 may have a simulator 200 or may not have it. For example, the simulator 200 may be implemented on another computer connected to the optimization processing apparatus 100 through a network. In addition, the simulator 200 may include a simulator for the search indicators and simulator for the judgment indicator, or may be one simulator having both functions.

The constraint data storage unit 101 stores plural constraint data sets to be set separately to the design parameters. The search indicator storage unit 102 stores plural search indicators. The search indicator obtaining unit 104 reads out data of the search indicators, which are stored in the search indicator storage unit 102, and output the read data to the search processing unit 105. The constraint data obtaining unit 103 reads out the constraint data set stored in the constraint data storage unit one-by-one, and outputs the read data to the search processing unit 105 and search result evaluation unit 107. The search processing unit 105 uses the constraint data obtained from the constraint data obtaining unit 103 and search indicators obtained from the search indicator obtaining unit 104, and cooperates with the simulator 200 to carry out the search in the design parameter space. The search result storage unit 106 stores the processing results of the search processing unit 105 and search result evaluation unit 107.

The search result evaluation unit 107 uses constraint data obtained from the constraint data obtaining unit 103 to carry out a processing to evaluate the search results stored in the search result storage unit 106, while cooperating with the optimum point search unit 109. In response to an instruction from the search result evaluation unit 107 or search indicator generator 108, the optimum point search unit 109 carries out a processing while cooperating with the simulator 200. The search result evaluation unit 107 may store the evaluation result of the search result into the search result storage unit 106. Moreover, when the search result evaluation unit 107 detects a state in which the search indicator should be generated as described below, the search result evaluation unit 107 outputs an instruction to the search indicator generator 108. The search indicator generator 108 uses data stored in the search result storage unit 106 and search indicator storage unit 102 to carry out a processing while cooperating with the optimum point search unit 109. In addition, the search indicator generator 108 also cooperates with the search processing unit 105 to cause the search processing unit 105 to also evaluate a new search indicator. Furthermore, the search indicator generator 108 stores the newly generated search indicator into the search indicator storage unit 102.

Figure 4:
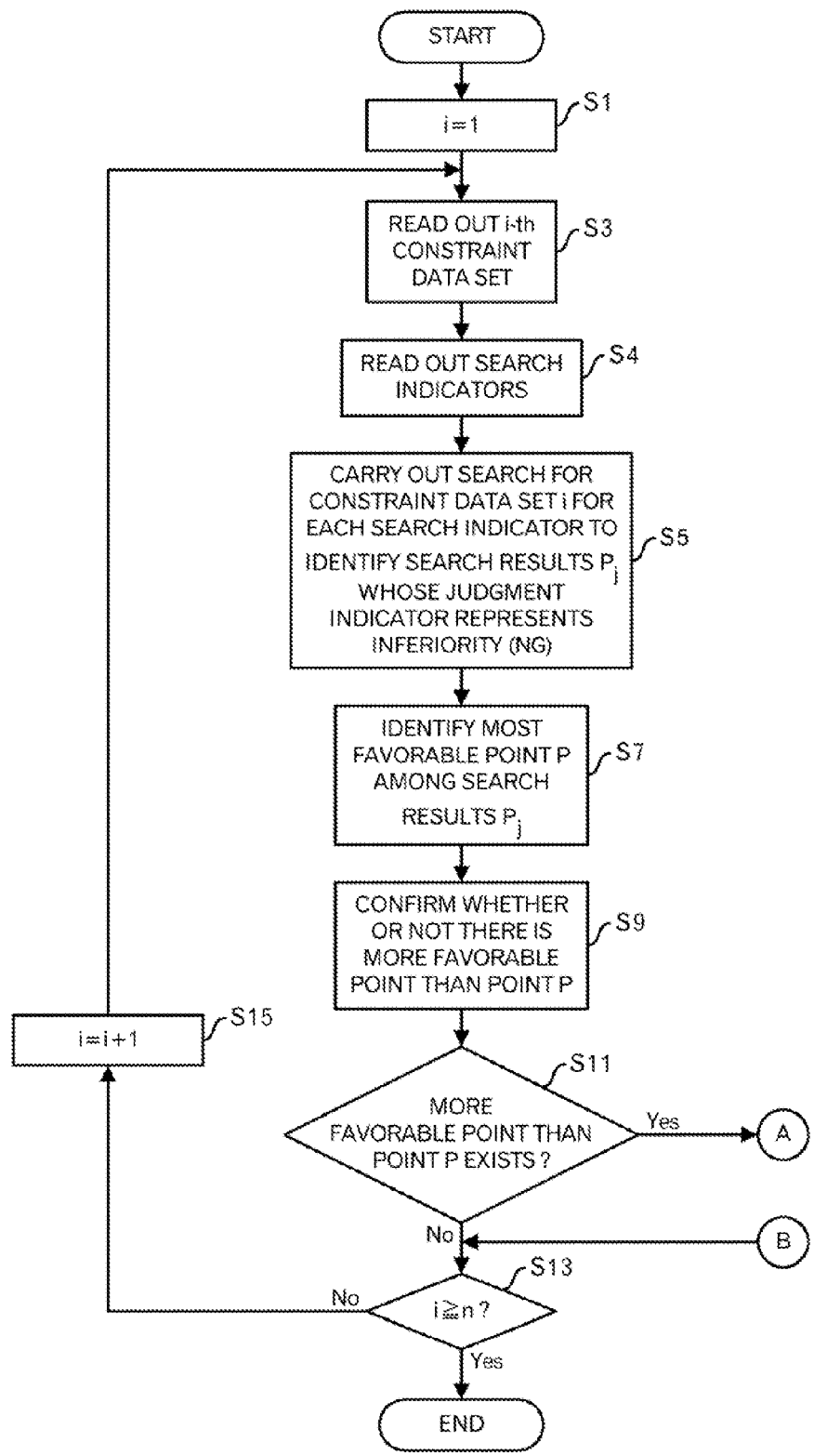
FIG. 4 is a diagram depicting a processing flow relating to a first embodiment.

Next, an operation of the optimization processing apparatus 100 will be explained by using FIGS. 4 to 7. First, for example, the constraint data obtaining unit 103 initializes a counter i to "1" (FIG. 4: step S1). Then, the constraint data obtaining unit 103 reads out i-th constraint data set from the constraint data storage unit 101 (step S3), and outputs the read data to the search processing unit 105. Moreover, the search indicator obtaining unit 104 reads out search indicators stored in the search indicator storage unit 102 (step S4), and outputs the read data to the search processing unit 105.

Then, the search processing unit 105 carries out the search for the constraint data set i for each search indicator j to identify a search result Pj whose judgment indicator represents NG, and stores the identified search result Pj into the search result storage unit 106 (step S5).

In this embodiment, the steepest descent method is used to carry out the search. In this embodiment, first (1) the search processing unit 105 sets the design center (the origin of the design parameter space) to a reference point, and (2) determines a point ql after moving, by $\Delta d$, from the reference point in a direction of each of axes of the respective design parameters. When the number of design parameters is "R", R points ql are determined. (3) Then, the search processing unit 105 outputs the reference point and respective points ql in addition to the constraint data set i to the simulator 200, and obtains values of the respective search indicators j from the simulator 200. Then, (4) the search processing unit 105 determines the steepest descent direction and movement distance from the search indicator values of the reference point and the respective points ql. This processing is well-known. Therefore, the detailed explanation is omitted. (5) In addition, the search processing unit 105 determines a point after moving, by the movement distance, in the steepest descent direction, and sets the determined point to the new reference point nk.

Here, (6) the search processing unit 105 outputs the new reference point nk and constraint data set j to the simulator 200, and obtains the value of the judgment indicator from the simulator 200. When the value of the judgment indicator is OK, the processing returns to (2), and the processing is repeated. On the other hand, when the value of the judgment indicator is NG, the processing ends. Thus, a first point whose value of the judgment indicator is NG is the search result Pj.

Figures 5, 6:
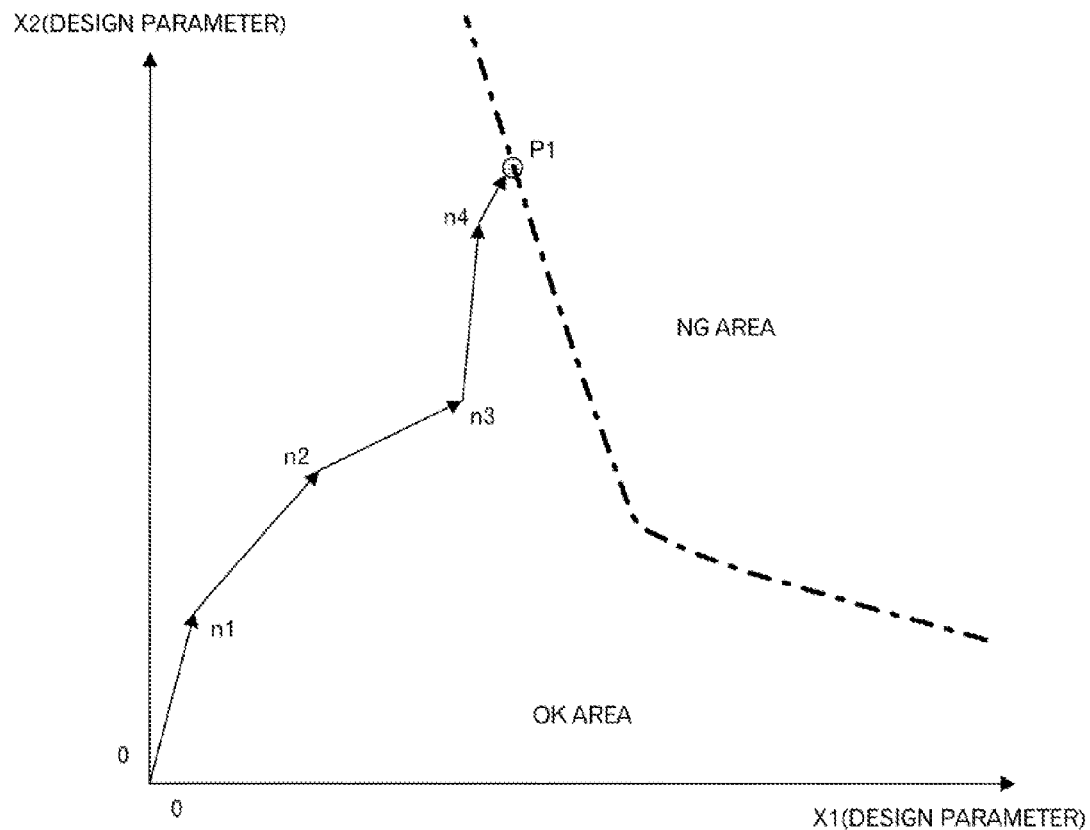
FIG. 5 is a diagram schematically depicting search in the steepest descent method.
FIG. 6 is a diagram depicting an example of data stored in a search result storage unit.

An example of FIG. 5 schematically illustrates a case in which the search is carried out using one search indicator, and when the search reaches the point P1 after moving from the design center to points n1, n2, n3 and n4, the value of the judgment indicator becomes NG. At that time, data as illustrated in FIG. 6 is stored in the search result storage unit 106. In the example of FIG. 6, for each point on the search route, coordinate values and search indicator value corresponding to the coordinate values are registered.

Because the search is carried out for each of the search indicators, the search as illustrated in FIG. 5 is repeated ω times. "ω" is the same as the number of search indicators, and ω data sets as illustrated in FIG. 6 are stored.

After that, the search result evaluation unit 107 identifies the most favorable point P among the search results Pj (step S7). When the point, which is nearest to the design center, is searched, the distance between the search result Pj and the design center is calculated to identify the point having the shortest distance.

Then, the search result evaluation unit 107 causes the optimum point search unit 109 to carry out a processing to confirm whether or not a more favorable point exists (step S9). Specifically, several sample points are generated around the point P, for example, and the coordinate values of the sample points and constraint data set i are outputted to the optimum point search unit 109. The optimum point search unit 109 outputs the coordinate values of the sample points and constraint data set i to the simulator 200, and obtains values of the judgment indicator from the simulator 200. After that, the optimum point search unit 109 outputs the values of the judgment indicator, which are outputs of the simulator 200, to the search result evaluation unit 107. The search result evaluation unit 107 calculates the distance with the design center for each sample point whose value of the judgment indicator is NG.

Then, the search result evaluation unit 107 determines whether or not a more favorable point than the point P exists, by determining whether or not the distance between the design center and the sample point is shorter than the distance between the point P and the design center (step S11). When the distance between the point P and the design center is shorter, it is presumed that a more favorable point does not exist. Then, the constraint data obtaining unit 103 determines whether or not the counter i is equal to or greater than the number n of constraint data sets (step S13). When i is equal to or greater than n, the processing ends. On the other hand, when i is less than n, the constraint data obtaining unit 103 increments i by "1" (step S15), and the processing returns to the step S3.

Figure 7:
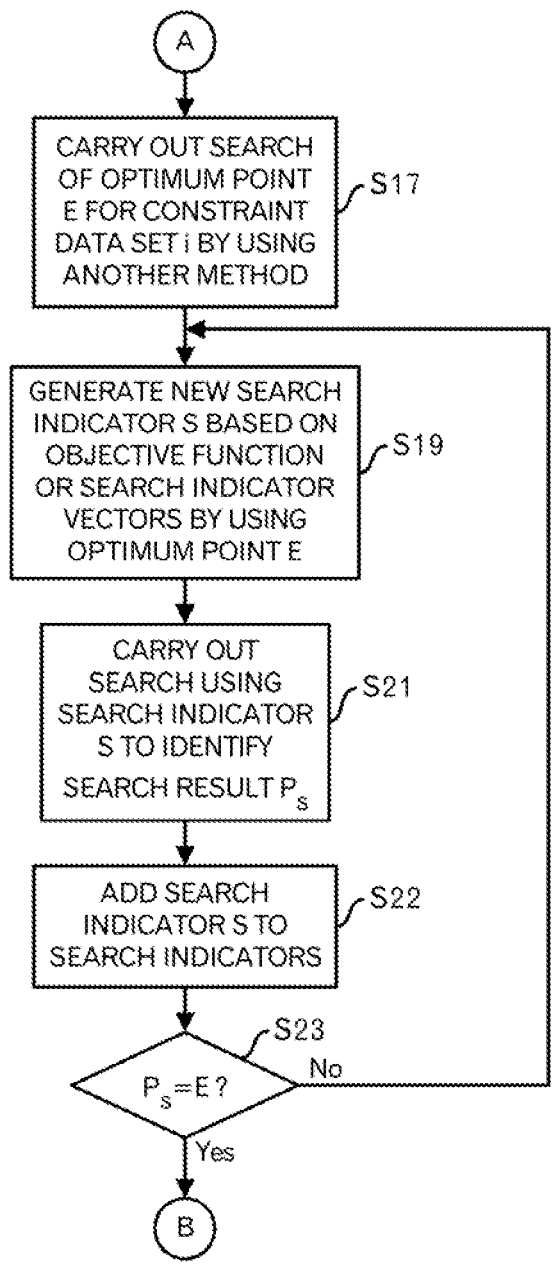
FIG. 7 is a diagram depicting a processing flow relating to the first embodiment.

On the other hand, when the distance between the design center and either of the sample points is shorter than the distance between the design center and the point P, the processing shifts to a processing flow of FIG. 7 through a terminal A.

The search result evaluation unit 107 instructs the search indicator generator 108 to generate the search indicator. First, the search indicator generator 108 instructs the optimum point search unit 109 to carry out an optimum point search for the constraint data set i, and the optimum point search unit 109 carries out a processing to search the optimum point for the constraint data set i by using a method other than the steepest descent method, in response to this instruction (step S17). For example, this processing is different from the step S9, and the optimum point search unit 109 generates a lot of sample points, for example, around the point P in the design parameter space, and outputs the coordinate values of the sample points and constraint data set i to the simulator 200 to cause the simulator 200 to execute the simulation. After that, the optimum point search unit 109 obtains the values of the judgment indicator from the simulator 200. Then, the optimum point search unit 109 identifies the optimum point E whose value of the judgment indicator is NG and whose distance with the design center is shortest. Then, the optimum point search unit 109 outputs data of the optimum point E to the search indicator generator 108. The search indicator generator 108 stores the data of the optimum point E to the search result storage unit 106.

The search indicator generator 108 generates a new search indicator S as a linear combination of at least certain of the search indicators stored in the search indicator storage unit 102, based on an objective function or search indicator vectors by using the optimum point E, and stores the generated search indicator S into a storage device such as a main memory (step S19).

In this step, by appropriately setting the objective function or by using feature vectors of the respective search indicators, a new search indicator, which is represented by the linear combination of at least certain of the present search indicators, is generated so as to obtain, as the search result, the optimum point E or an adjacent point of the optimum point E. Or, by appropriately setting the objective function or by using feature vectors of the respective search indicators, a new search indicator, which is represented by the linear combination of at least certain of the present search indicators, is generated so that the search is carried out in a direction from the design center to the optimum point E.

More specifically, as a first method, coefficients of the linear combination are determined so that the linear combination of the feature vectors (e.g. steepest descent vectors at characteristic points or the like) or the linear combination of first vectors that are particular vectors included in the feature vectors is parallel to a second vector representing the optimum point E or a third vector generated by projecting the second vector to a partial space mapped by the first vectors. Then, the new search indicator is generated by linearly combining the search indicators with the corresponding determined coefficients.

In addition, as a second method, the coefficients in the new search indicator represented by the linear combination of the respective search indicators are determined so that an objective function regarding a difference between a slope to the search result Pj by the new search indicator and a slope to the optimum point E by the new search indicator or an objective function regarding the value change of the new search indicator at points adjacent to the optimum point in a direction to the optimum point E is maximized. Then the new search indicator is generated by linearly combining the search indicators with the corresponding determined coefficients.

Thus, for the present constraint data set i, the new search indicator, by which the optimum point E is searched, is generated.

Then, the search indicator generator 108 instructs the search processing unit 105 to carryout the search by the new search indicator S. Then, the search processing unit 105 carries out the search cooperating with the simulator 200 by using the search indicator S. Namely, the search processing unit 105 obtains the search result Ps (a point whose judgment indicator is NG) from the simulator 200, and outputs the search result Ps to the search indicator generator 108 (step S21). Moreover, the search indicator generator 108 additionally registers the search indicator S into the search indicator storage unit 102 (step S22).

The search indicator generator 108 confirms whether or not the search result Ps=the optimum point E is satisfied (step S23). When the search result Ps=the optimum point E is satisfied, the processing returns to the step S13 through a terminal B. On the other hand, when the search result Ps=the optimum point E is not satisfied, the processing returns to the step S19.

By carrying out such a processing, the new search indicator is generated until the search result Ps by the new search indicator S becomes the optimum point E, and stored into the search indicator storage unit 102. Even when the search indicator, which cannot cause to reach the optimum point E, is obtained, there is possibility that the search indicator is useful for the search for the next constraint data set. Therefore, the search indicator is additionally registered into the search indicator storage unit 102.

By carrying out the aforementioned processing, the search indicator, which is considered as being useful in the search for the next constraint data set, is generated. Therefore, it is expected that it becomes possible to identify the optimum point by the processing with the shorter time, namely much efficiently than the exhaustive search in the design parameter space.

Embodiment 2

For example, in the design of SRAM, the gate length and gate width of the transistor included in SRAM, power supply voltage, temperature and a set of average values of plural design parameters such as Vth of the respective transistors are set to "constraint data", and the simulation is carried out under various constraints. In each simulation, the yield of one cell (element in SRAM, which corresponds to 1 bit), for which variation around the average value of the design parameter is taken into consideration, is determined. Therefore, the yield of one cell is calculated by Importance Sampling Monte Carlo (ISMC). In ISMC, the accuracy of the Most Probable Point (MPP. the aforementioned point that represents inferiority and is nearest to the design center.) is important. However, in the yield calculation of SRAM, a judgment indicator representing whether or not the cell is operable in a state when the design parameters are determined (good or bad. also called OK or NG) and plural search indicators, which do not always correspond to the judgment indicator, are given. Therefore, a new search indicator to accurately find out MPP is determined by using a method of this embodiment, and in a processing under other constraints, the time required for the determination of MPP is shortened by also using the new search indicator, compared with the conventional technique.

In this embodiment, explanation will be made with a mind to such SRAM design. Incidentally, the configuration of the optimization processing apparatus 100 relating to this embodiment is almost the same as that illustrated in FIG. 3, although the functions are partially different. Therefore, the explanation is omitted.

Next, the processing of this embodiment will be explained by using FIGS. 8 to 22.

Figure 8:
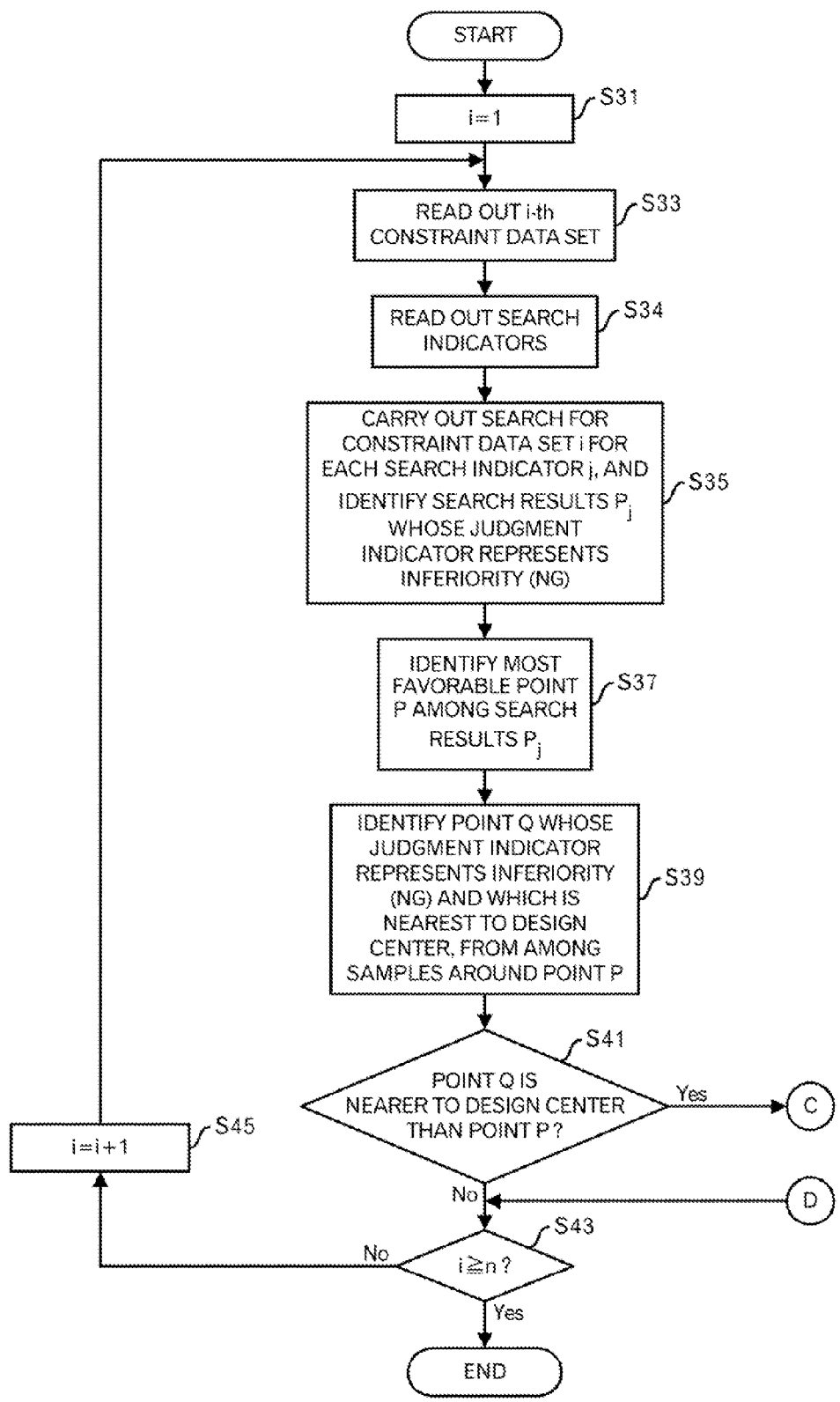
FIG. 8 is a diagram depicting a processing flow relating to a second embodiment.

First, for example, the constraint data obtaining unit 103 initializes a counter i to "1" (FIG. 8: step S31). Then, the constraint data obtaining unit 103 reads out an i-th constraint data set from the constraint data storage unit 101 (step S33), and outputs the read data to the search processing unit 105. First, the search indicator obtaining unit 104 reads out search indicators stored in the search indicator storage unit 102 (step S34), and outputs the read data to the search processing unit 105.

Then, the search processing unit 105 carries out the search for the constraint data set i for each search indicator j, and identifies a search result Pj whose judgment indicator represents the inferiority (NG), and stores the identified search results into the search result storage unit 106 (step S35). This step is the same as the step S5. Therefore, explanation of the detailed processing contents is omitted.

After that, the search result evaluation unit 107 identifies a point P that is nearest to the design center from among the search results Pj (step S37). The distances between the design center and the respective search results Pj are calculated to identify a point whose distance is the shortest.

Then, the search result evaluation unit 107 generates several sample points around the point P, and identifies a point Q whose judgment indicator represents NG (inferiority) and which is nearest to the design center (step S39). Specifically, the search result evaluation unit 107 outputs the coordinate values of the sample point and constraint data set i to the optimum point search unit 109. The optimum point search unit 109 outputs the coordinate values of the sample point and constraint data set i to the simulator 200, and obtains the value of the judgment indicator from the simulator 200. After that, the optimum point search unit 109 outputs the value of the judgment indicator, which is an output of the simulator 200, to the search result evaluation unit 107. The search result evaluation unit 107 calculates the distance between the design center and the sample point whose value of the judgment indicator is NG, and identifies, as the point Q, the sample point whose distance with the design center is shortest.

Then, the search result evaluation unit 107 determines whether or not the point Q is nearer to the design center than the point P (step S41). When the distance between the design center and the point Q is shorter than the distance with the point P, there is possibility that a more favorable point exists in the design parameter space. Therefore, the processing shifts to a processing of FIG. 9 through a terminal C.

When the distance between the point P and the design center is shorter, it is presumed that the point P is the optimum solution. Then, the constraint data obtaining unit 103 determines whether or not the counter i is equal to or greater than the number n of constraint data sets (step S43). When i is equal to or greater than n, the processing ends. On the other hand, when i is less than n, the constraint data obtaining unit 103 increments i by "1" (step S45), and the processing returns to the step S33.

Figure 9:
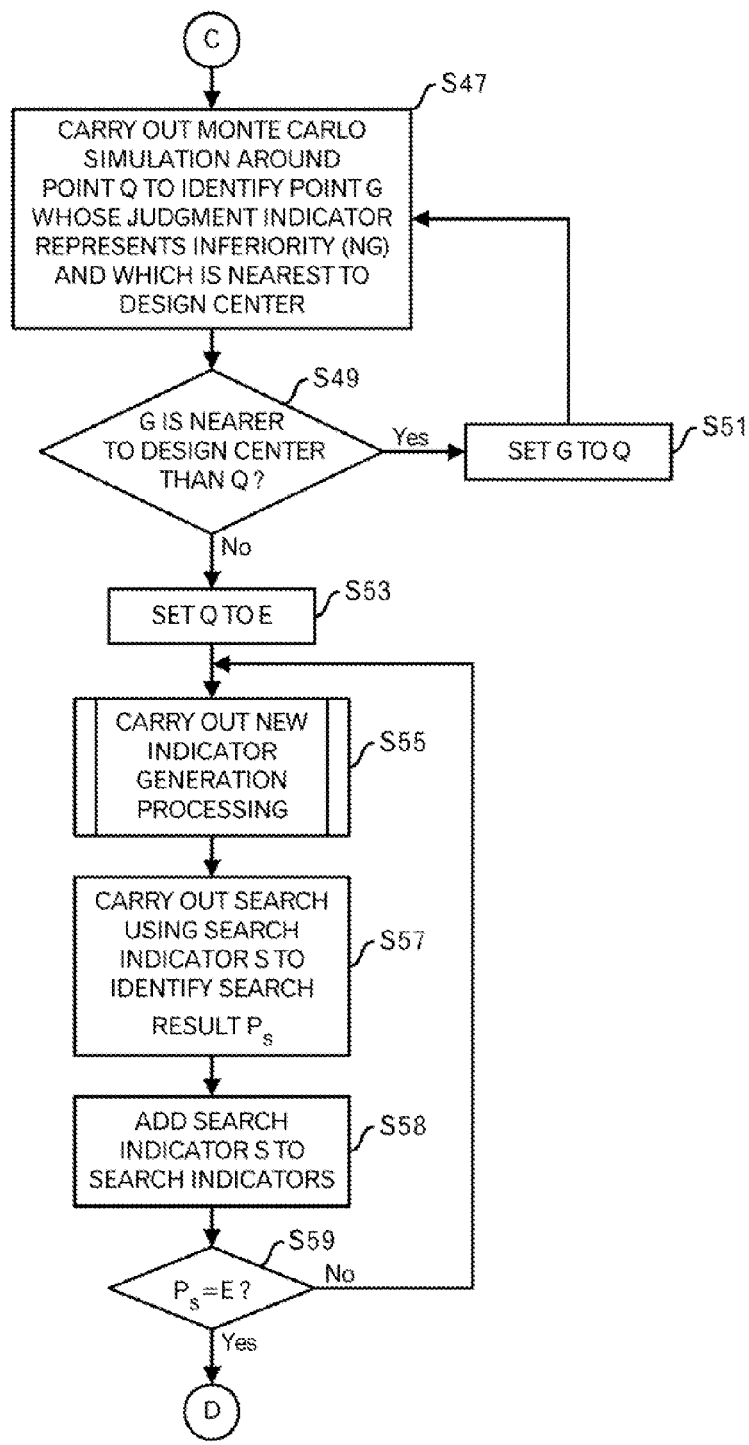
FIG. 9 is a diagram depicting a processing flow relating to the second embodiment.

Shifting to the explanation of the processing in FIG. 9, the search result evaluation unit 107 instructs the search indicator generator 108 to generate the search indicator. First, the search indicator generator 108 causes the optimum point search unit 109 to carry out Monte Carlo simulation using, as the center point, the point Q, for the constraint data set i. Specifically, a lot of sample points are generated around the point Q, and for each sample point, the value of the judgment indicator is calculated by the simulator 200. Then, the optimum point search unit 109 identifies a point G whose value of the judgment indicator is NG (inferiority), and which is the nearest sample point to the design center (step S47).

Figure 10:
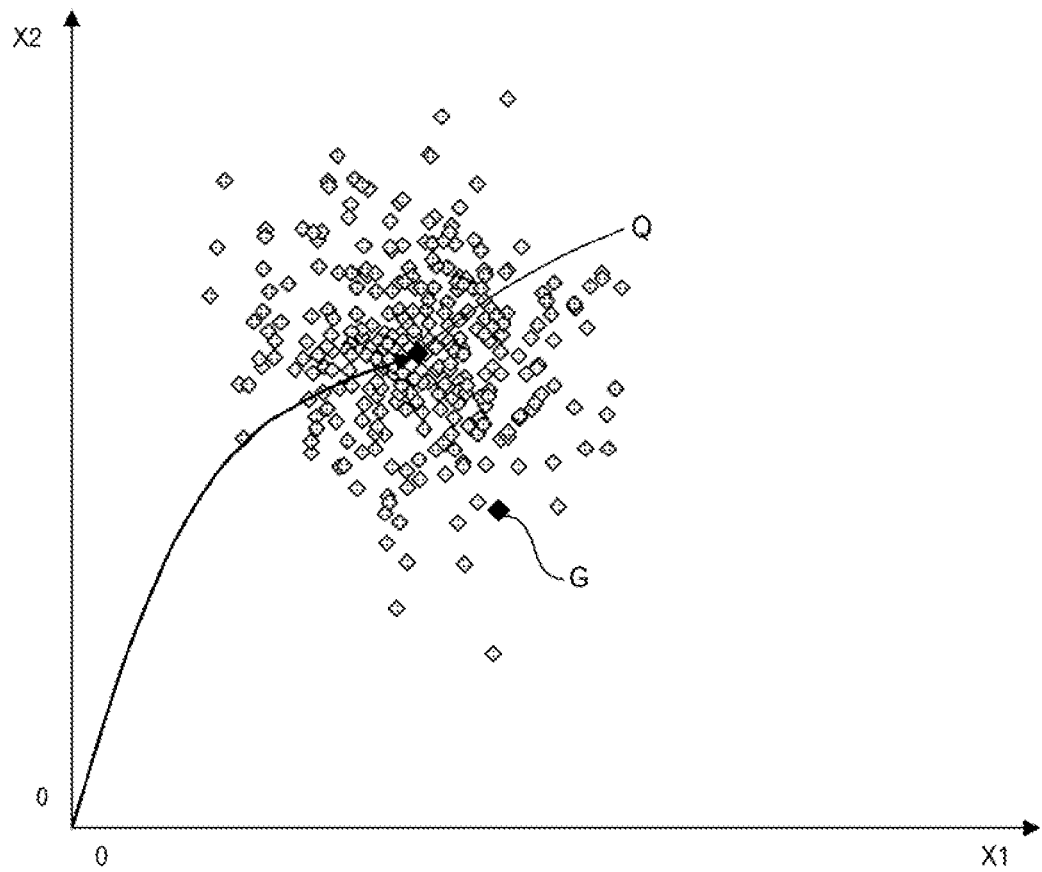
FIG. 10 is a diagram schematically depicting calculation of an optimum point.

For example, as illustrated in FIG. 10, in the design parameter space mapped by the design parameters X1 and X2, when the search is carried out from the design center (the origin) along the arrow, the point Q whose value of the judgment indicator is NG is obtained. However, when the step S47 is carried out, the value of the judgment indicator is calculated for a lot of sample points as illustrated in FIG. 10. The sample point G whose value of the judgment indicator is NG and which is nearest to the design center is identified among these sample points. Namely, the distance with the design center is calculated to identify the sample point G whose distance is the shortest.

Then, the optimum point search unit 109 determines whether or not the point G is nearer to the design center than the point Q (step S49). This step is carried out by comparing the distances with the design center. When the point G is nearer to the design center than the point Q, there is possibility that a more favorable point is found. Therefore, the optimum point search unit 109 sets the point G to the point Q (step S51), and the processing returns to the step S47.

On the other hand, when the point G is not nearer to the design center than the point Q, the optimum point search unit 109 sets the point Q to the point E (step S53), and outputs data of the point E to the search indicator generator 108. The search indicator generator 108 receives data of the point E from the optimum point search unit 109, and stores the received data into the search result storage unit 106.

Then, the search indicator generator 108 uses the data of the point E, which is stored in the search result storage unit 106, and carries out a new indicator generation processing (step S55). The new indicator generation processing will be explained in detail later.

After that, the search indicator generator 108 instructs the search processing unit 105 to carry out the search using the new search indicator S. Then, the search processing unit 105 carries out the search, while cooperating with the simulator 200 by using the search indicator S. In other words, the search processing unit 105 obtains the search result Ps (a point whose judgment indicator becomes NG) from the simulator 200, and outputs the search result Ps to the search indicator generator 108 (step S57). Moreover, the search indicator generator 108 additionally registers the search indicator S into the search indicator storage unit 102 (step S58).

Then, the search indicator generator 108 confirms whether or not the search result Ps=the optimum point E is satisfied (step S59). When the search result Ps=the optimum point E is satisfied, the processing returns to the step S43 through a terminal D. On the other hand, when the search result Ps=the optimum point E is not satisfied, the processing returns to the step S55.

By carrying out such a processing, a new search indicator is generated and stored into the search indicator storage unit 102, until the search result Ps by the new search indicator S becomes the optimum point E. Even when the search indicator, which cannot cause to reach the optimum point E is generated, there is possibility that the search indicator is useful for the search for the next constraint data set. Therefore, the search indicator, which cannot cause to reach the optimum point E, is additionally registered into the search indicator storage unit 102.

Next, the new indicator generation processing will be explained by using FIGS. 11 to 22. First, a first method will be explained by using FIGS. 11 to 15.

Figure 11:
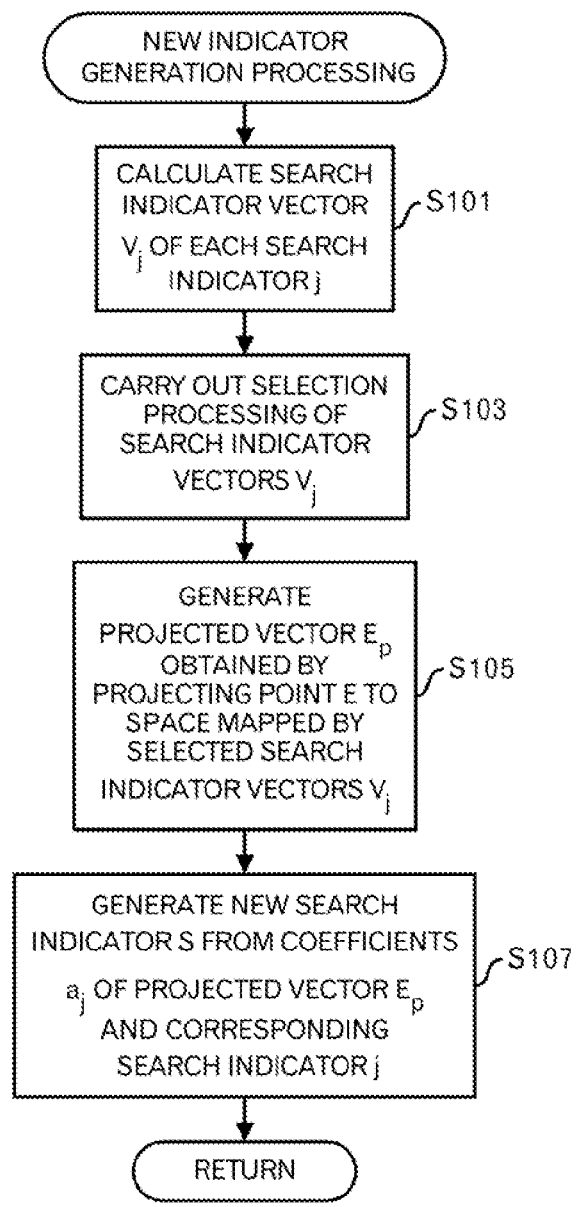
FIG. 11 is a diagram depicting a processing flow of a first new indicator generation processing.

The search indicator generator 108 calculates a search indicator vector Vj for each search indicator j, and stores the search indicator vector Vj into a storage unit such as a main memory (FIG. 11: step S101).

Figure 12:
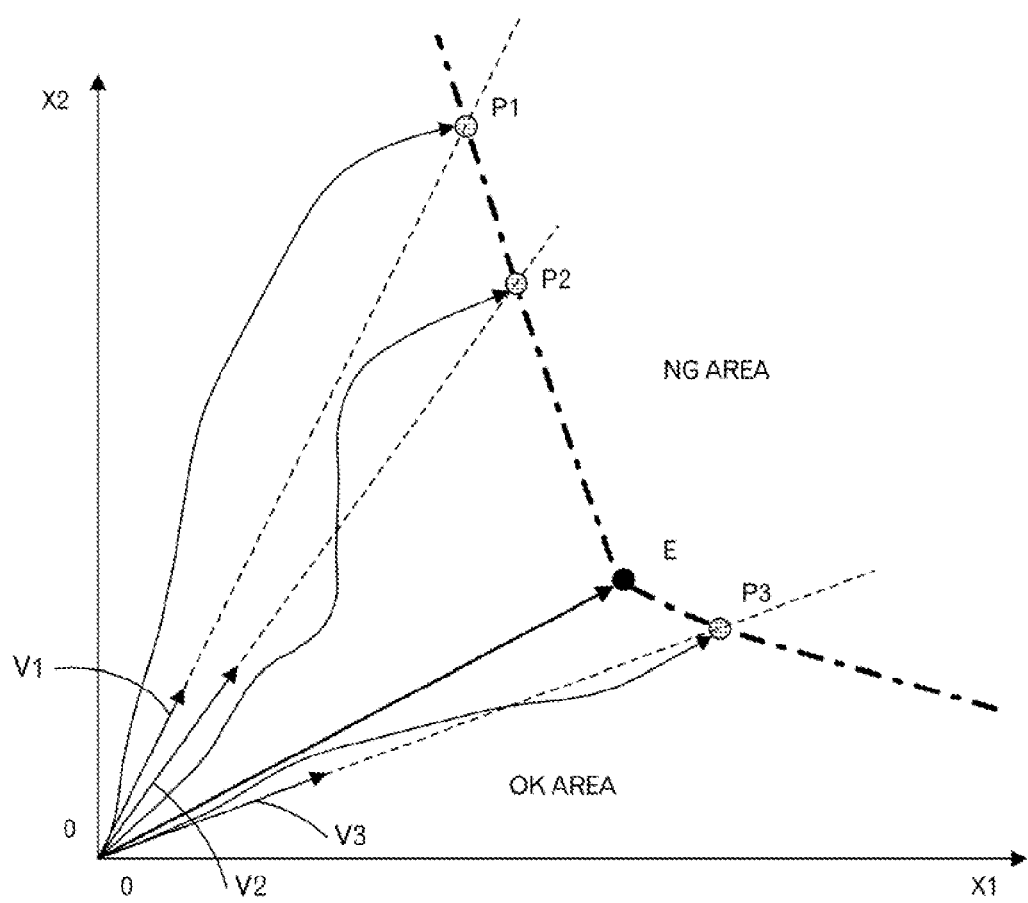
FIG. 12 is a diagram to explain the first new indicator generation processing.

As illustrated in FIG. 12, in the design parameter space mapped by the design parameters X1 and X2, the unit vectors from the design center to the search results P1, P2 and P3 are represented by e1, e2 and e3. Then, for each search indicator j, the search indicator vector Vj as described below is calculated.

$$V_1 = \frac{(T_1(0) - T_1(P_1))}{|P_1|} e_1$$

$$V_2 = \frac{(T_2(0) - T_2(P_2))}{|P_2|} e_2$$

$$V_3 = \frac{(T_3(0) - T_3(P_3))}{|P_3|} e_3$$

However, the value at the point x for the search indicator j is represented as Tj(x). In addition, |Pj| represents the distance from the design center to the point Pj. Thus, the search indicator vector is a feature vector Vj of the search indicator j, which has an average slope from the design center to the search result Pj in the direction of the search result Pj.

Figure 13:
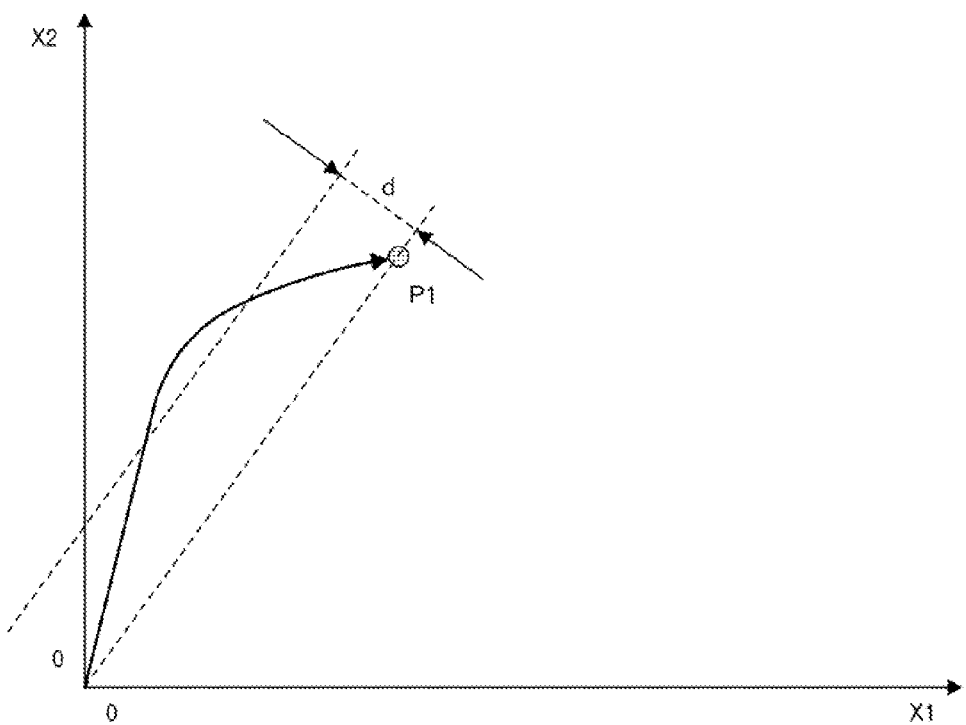
FIG. 13 is a diagram to explain a selection processing.

The search indicator generator 108 carries out a selection processing of the search indicator vectors Vj (step S103). In this embodiment, the selection processing is carried out in two viewpoints. For example, in the first viewpoint, as schematically illustrated in FIG. 13, in case where the search is carried out by using the search indicator j, when the distance d between a point on the route from the design center to the search result Pj and a straight line connecting the design center to the search result Pj is not less a predetermined reference value, the search indicator j is excluded. In other words, this is because the search indicator relating to the search route that takes a long way around too much is not appropriate for adopting it as an average search indicator vector.

In addition, in the second viewpoint, when a new search indicator S is generated based on the linear combination of the search indicator vectors Vj, a set of the search indicator vectors Vj must be linearly independent. Therefore, when the combination of the search indicator vectors Vj, which are selected based on the first viewpoint, is linearly dependent, a search indicator vector is removed in sequence from a search indicator vector whose aforementioned distance d is larger, until remaining search indicator vectors becomes linearly independent. However, because there are plural combinations of the search indicator vectors which are linearly independent, the search indicator vector to be removed may be determined from other viewpoints.

Then, the search indicator generator 108 generates a projected vector Ep obtained by projecting the point E to a partial space mapped by the selected search indicator vectors Vj, and stores the generated vector into the storage device such as the main memory (step S105). When the selection is not carried out in an example of FIG. 12, E=Ep=a1*V1+a2*V2+a3*V3. Coefficients aj satisfying such a relationship are calculated. In addition, when V3 is excluded, a1 and a2, which satisfy Ep=a1*V1+a2*V2, are calculated.

Then, the search indicator generator 108 generates a new search indicator S from the coefficients aj of the projected vector Ep and corresponding search indicators j, and stores the new search indicator S into the storage device such as the main memory (step S107). In the aforementioned example, the new search indicator S is generated in a form of "new search indicator S=a1* search indicator 1+a2* search indicator 2+a3* search indicator 3". Then, the processing returns to the calling-source processing.

When using the new search indicator S obtained by the aforementioned method, the search is carried out in the direction from the design center to the point E.

Incidentally, the search indicator vector is not limited to the aforementioned vector. For example, (A) at plural points in the design parameter space, the steepest descent vectors for each search indicator j may be calculated, and the average vector of the steepest descent vectors at the plural points may be adopted for the feature vector for each search indicator j. Thus, it is possible to use the search indicator vectors for which the distribution of the steepest descent vectors in the design parameter space is taken into consideration.

In addition, (B) paying attention to the point E, for each search indicator j, the steepest descent vector at the point E may be adopted, as the feature vector, for the search indicator vector. Furthermore, (C) paying attention to the design center, for each search indicator j, the steepest descent vector at the design center may be adopted, as the feature vector, for the search indicator vector.

Figure 14:
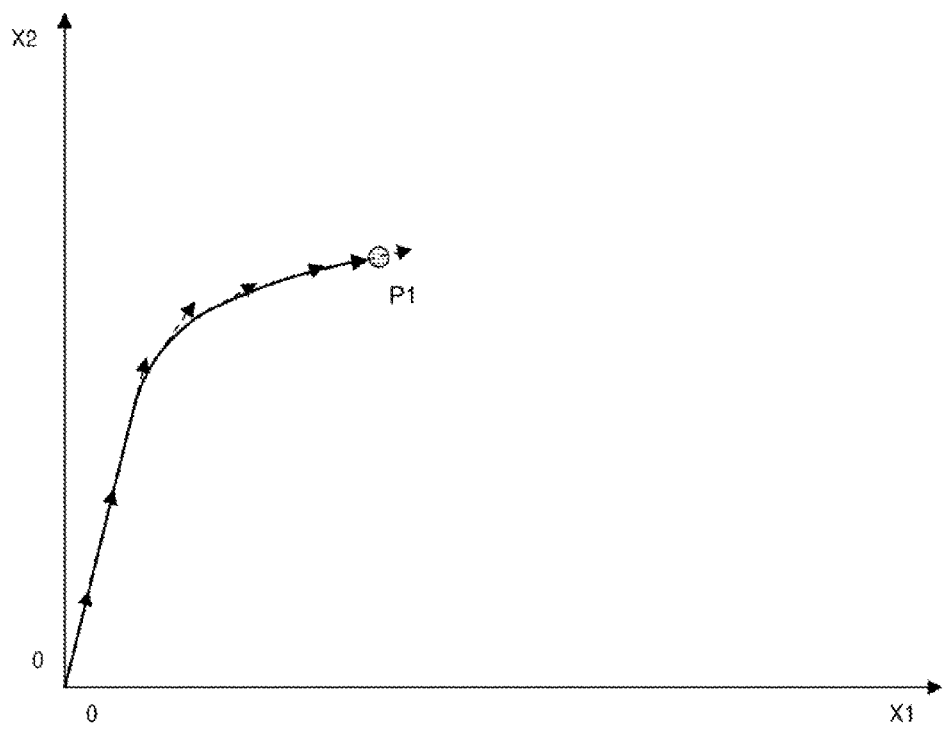
FIG. 14 is a diagram depicting an example of a search indicator vector.

Furthermore, as schematically illustrated in FIG. 14, (D) paying attention to the search route of each search indicator j, the average vector of the steepest descent vectors at plural arbitrary points on the search route may be adopted, as the feature vector, for the search indicator vector.

Figure 15:
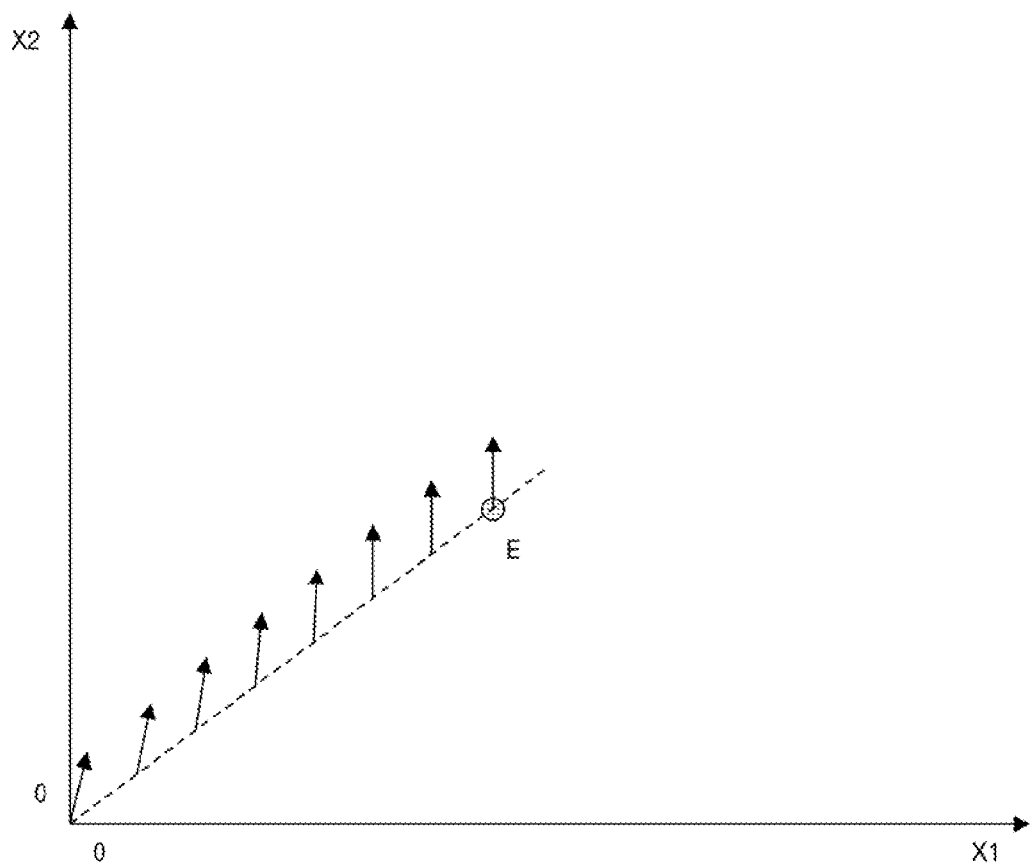
FIG. 15 is a diagram depicting an example of the search indicator vector.

In addition, as schematically illustrated in FIG. 15, (E) the steepest descent vectors at plural arbitrary points on a segment from the design center to the point E may be calculated for each search indicator j, the average vector of the steepest descent vectors at the plural points may be calculated for each search indicator j, and the average vector may be adopted, as the feature vector, for the search indicator vector.

Furthermore, (F) the steepest descent vectors at the sample points generated by the Monte Carlo simulation, for example, at the step S47 may be calculated for each search indicator j, the average vector of the steepest descent vectors at the plural sample points may be calculated for each search indicator j, and the average vector may be adopted, as the feature vector, for the search indicator vector.

Incidentally, in the selection for (A), (D), (E) and (F), the search indicator for which the steepest descent vectors whose variation is equal to or greater than a reference value are calculated is excluded. Moreover, when the selected search indicator vectors are linearly dependent, further selection is carried out. As for (B) and (C), when they are linearly dependent, the selection is carried out.

Furthermore, when a method such as (A) and (F) is adopted, the design parameter space may be divided into plural areas and the new search indicator may be generated for each area. Specifically, for each area, the search indicator vector is generated for each search indicator j, and after the selection, the projected vector Ep is calculated, and the search indicators j is linearly combined by coefficients of the projected vectors Ep. Incidentally, the new search indicator may be generated by the following method. In other words, a vector E' from a representative point (e.g. the center of gravity in the area) to the point E is calculated for each area. Then, the projected vector Ep' is calculated by projecting the vector E' to a space mapped by the search indicator vectors. After that, the search indicators j are linearly combined by the coefficients of the projected vectors Ep'. Thus, according to the new search indicator, the search is carried out in the direction from the representative point of each area to the point E.

Next, the method (B) will be explained in detail by using FIGS. 16 and 17.

Figure 16:
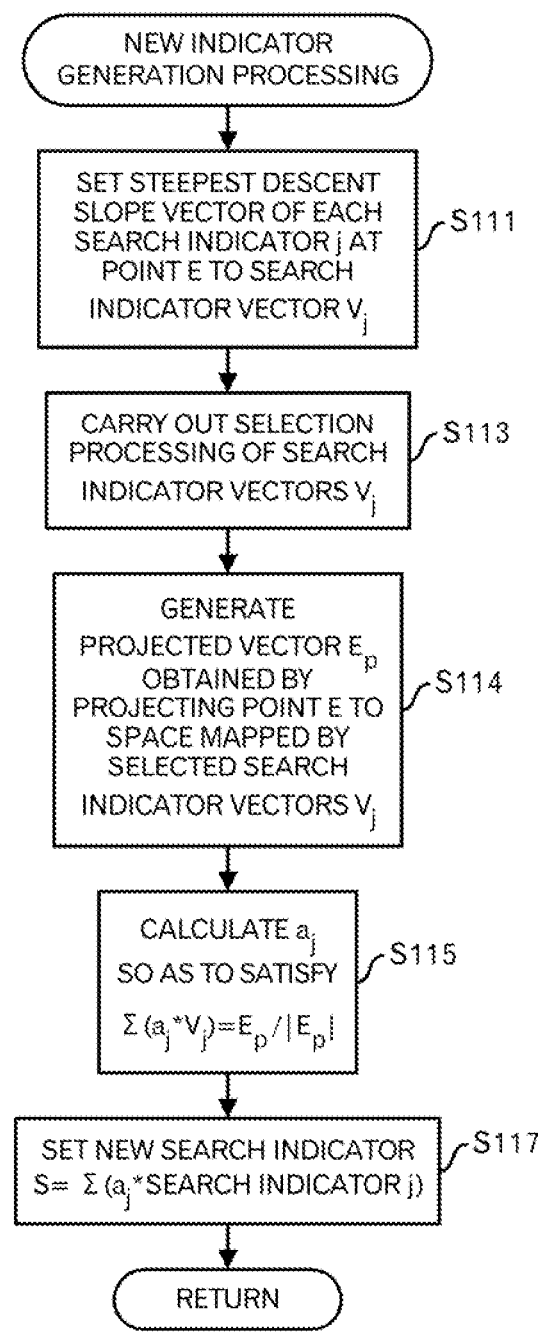
FIG. 16 is a diagram depicting a processing flow of a second new indicator generation processing.
Figure 17:
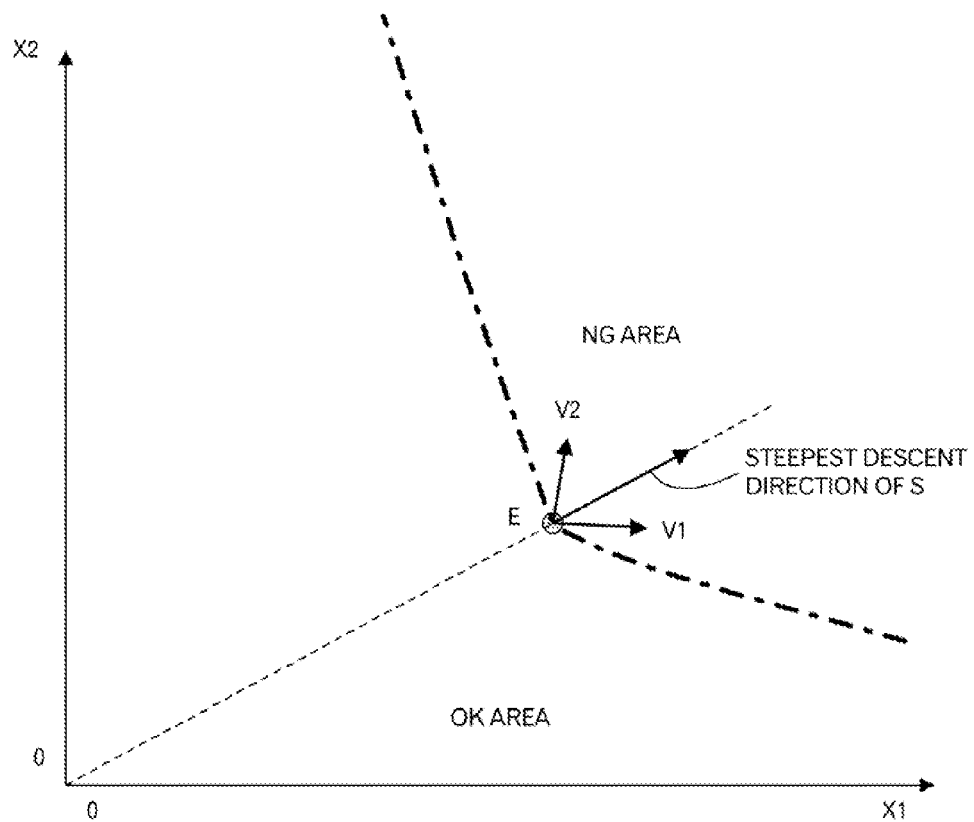
FIG. 17 is a diagram to explain the second new indicator generation processing.

First, the search indicator generator 108 sets, as the feature vector, the steepest descent vector of each search indicator j at the point E to the search indicator vector Vj (FIG. 16: step S111). In FIG. 17, in the design parameter space mapped by the design parameters X1 and X2, the steepest descent vectors V1 and V2 of each search indicator j at the point E are depicted.

Then, the search indicator generator 108 carries out a selection processing of the generated search indicator vectors Vj (step S113). Here, when the search indicator vectors Vj are linearly dependent, any search indicator vector Vj is excluded, until the remaining search indicators become linearly independent. For example, the search indicator vector Vj, which is largely out of the direction from the design center to the point E, is excluded.

After that, the search indicator generator 108 generates a projected vector Ep obtained by projecting the point E to a partial space mapped by the selected search indicator vector Vj, and stores the projected vector Ep into the storage device such as the main memory (step S114).

Furthermore, the search indicator generator 108 calculates coefficients aj so as to satisfy $\Sigma(aj*Vj)=Ep/|Ep|$, and stores the coefficients aj into the storage device such as the main memory (step S115). The coefficients aj are set so that steepest descent vector ($=\Sigma(aj*Vj)$) by the new search indicator S is in the direction of the point E.

Then, the search indicator generator 108 generates the new search indicator $S=\Sigma(aj*$ search indicator j) from the coefficients aj of the projected vector Ep and corresponding search indicators j, and stores the new search indicator S into the storage device such as the main memory (step S117). In the example of FIG. 17, the new search indicator S=a1* search indicator 1+a2* search indicator 2 are generated. Then, the processing returns to the calling-source processing.

Next, a first method using an objective function will be explained by using FIGS. 18 to 20. In this embodiment, an objective function is set, which relates to a total sum of differences between an average slope in the direction of the search result Pi, which is calculated for the new search indicator S, and an average slope in the direction of the point E, which is calculated for the new search indicator S, and the new search indicator S is determined so as to maximize a value of the objective function.

Figure 18:
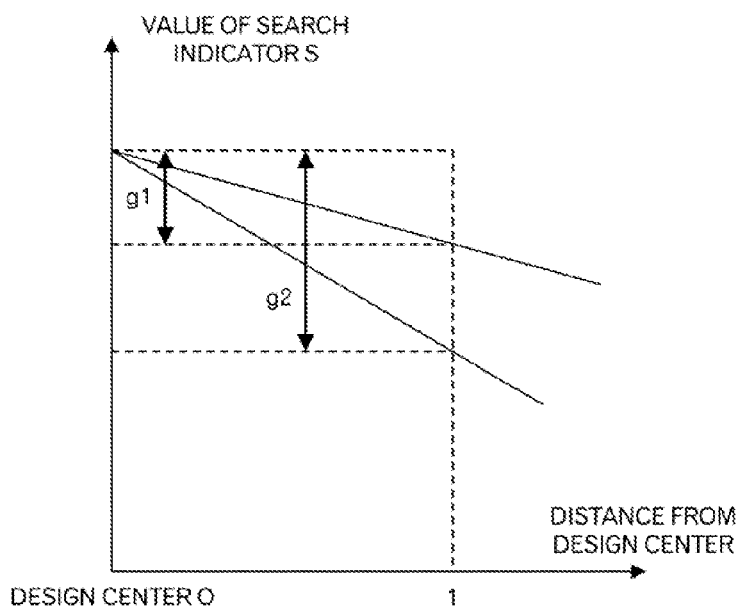
FIG. 18 is a diagram to explain a third new indicator generation processing.

As schematically illustrated in FIG. 18, when the new search indicator S is set so that the average slope g2 in the direction from the design center O to the point E is greater than the average slope g1 in the direction from the design center O to the search result Pi, the value of the aforementioned objective function also becomes greater. Then, when the search from the design center O is carried out by the steepest descent method, it is expected that the search is carried out in the direction of the point E.

Figure 19:
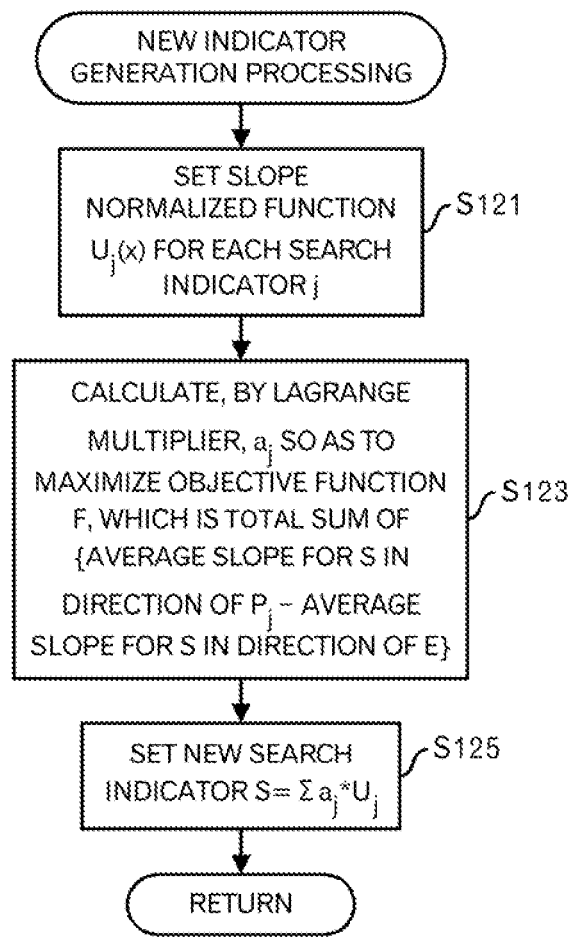
FIG. 19 is a diagram depicting a processing flow of the third new indicator generation processing.

Specifically, the search indicator generator 108 sets a slope normalized function Uj(x) for each search indicator j, and stores data of the function into the storage device such as the main memory (FIG. 19: step S121).

$$U_j(x) = \frac{|P_j|}{T_j(0) - T_j(P_j)} T_j(x)$$

Incidentally, the value at the point x is represented as Tj(x) for the search indicator j. In addition, |Pj| represents the distance from the design center to the point Pj. Thus, a function normalized so that the slope from the design center to the search result Pj becomes "−1" is obtained.

Moreover, in this example, the new search indicator $S=\Sigma_i a_i U_i$ and $\Sigma_i a_i^2 =1$ are satisfied.

Then, in this example, as described above, a following objective function F is assumed.

$$F(a) = \sum_j \left( \frac{S(P_j) - S(0)}{|P_j|} - \frac{S(E) - S(0)}{|E|} \right)$$

Figure 20:
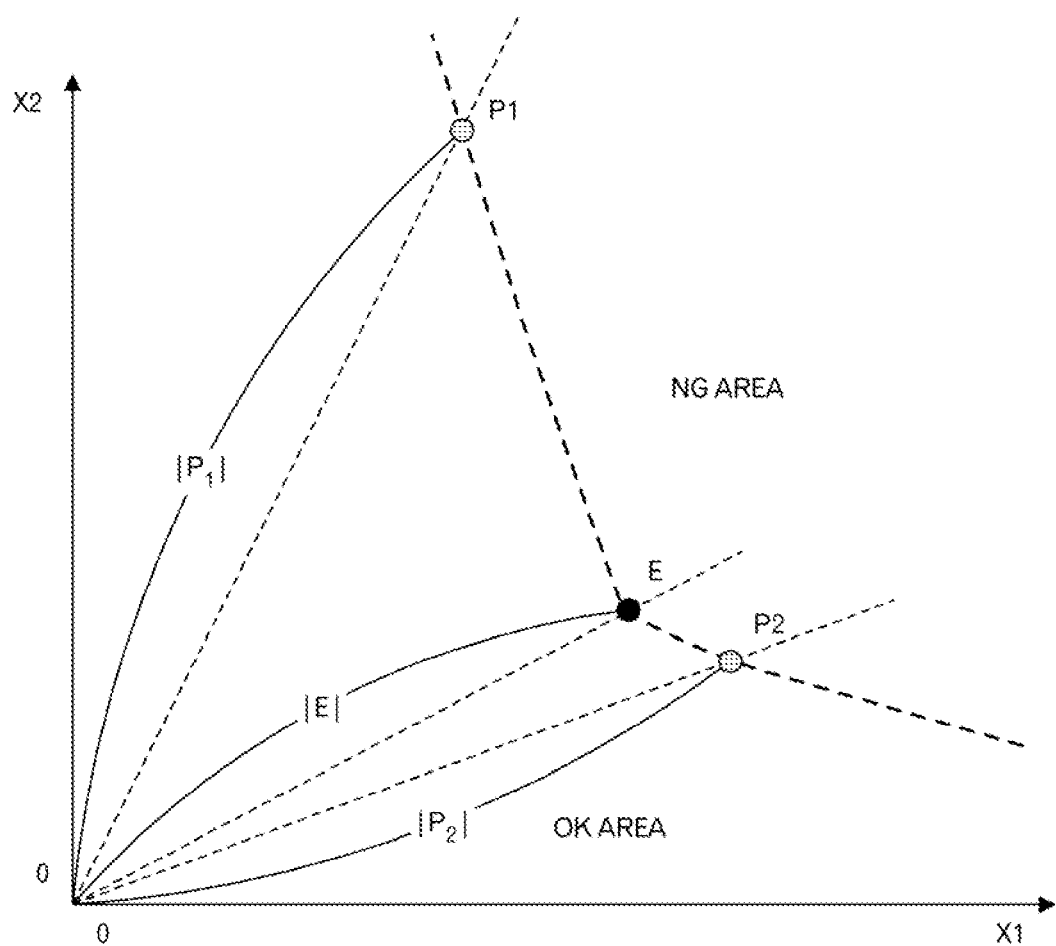
FIG. 20 is a diagram to explain the third new indicator generation processing.

As illustrated in FIG. 20, in the design parameter space mapped by the design parameters X1 and X2, the distance between the search result P1 and the design center is |P1|, and the distance between the search result P2 and the design center is |P2|, and the distance between the point E and the design center is |E|.

In the objective function F, the values of the new search indicator S at the points P1, P2, E and the design center O are used.

Then, in this example, as described above, the search indicator generator 108 calculates, by using Lagrange multiplier, aj so as to maximize the objective function F, which is a total sum of {average slope in the direction of Pj for the new search indicator S−average slope in the direction of E for the new search indicator S}, and stores aj into the storage device such as the main memory (step S123).

Specifically, in Lagrange multiplier, a following equation is defined as follows:

$$L(a, \lambda) = F(a) - \lambda \left( \sum_i a_i^2 - 1 \right)$$

At that time, the extreme value condition of L (a, λ) is represented as follows:

$$\frac{\partial L}{\partial a_i} = c_i - 2\lambda a_i = 0$$

$$\therefore a_i = \frac{c_i}{2\lambda}$$

However, ci is represented as follows:

$$c_i = \sum_j \left( \frac{U_i(P_j) - U_i(0)}{|P_j|} - \frac{U_i(E) - U_i(0)}{|E|} \right)$$

Here, λ may be determined from "$\Sigma_i a_i^2 = 1$". However, because the search results for S and k*S are identical, any one of λ=½ or λ=−½ is adopted, which satisfies S(0)>S(E).

Then, as described above, the search indicator generator 108 sets the new search indicator $S = \Sigma_j a_j U_j$, and stores the new search indicator into the storage device such as the main memory (step S125).

Thus, the search indicator S, by which the search is carried out in the direction of the point E, is generated.

Figure 21:
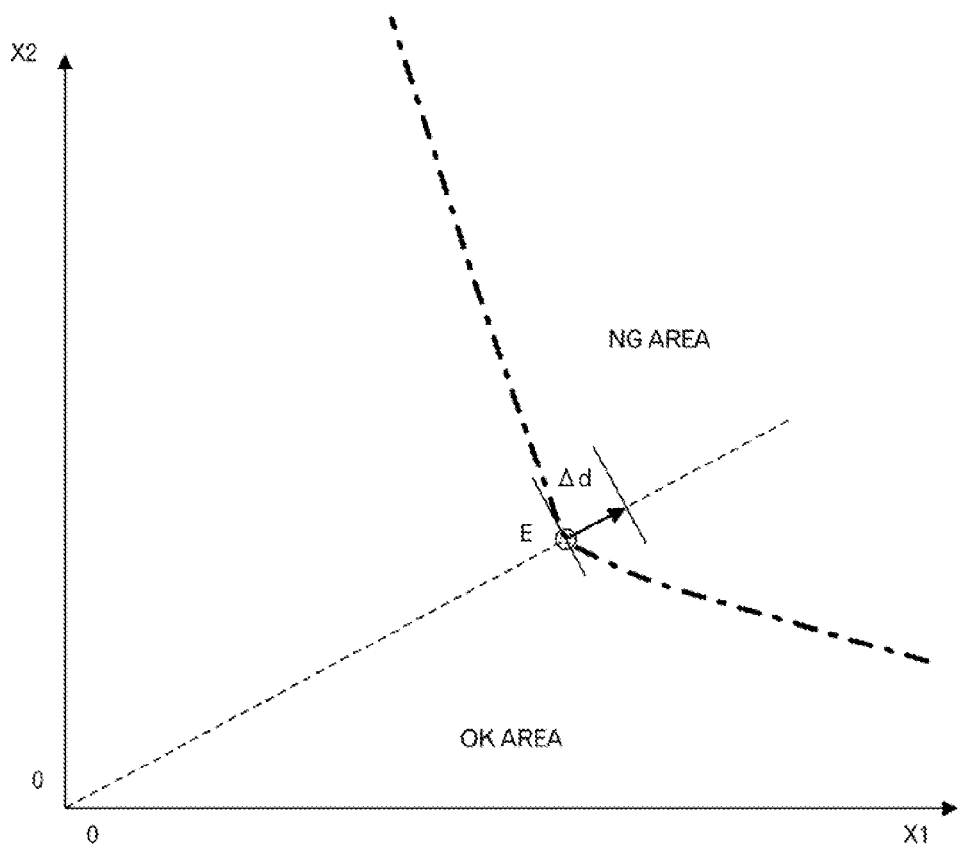
FIG. 21 is a diagram to explain a fourth new indicator generation processing.

Next, a second method using the objective function will be explained by using FIGS. 21 and 22. In this example, as schematically illustrated in FIG. 21, in the design parameter space mapped, for example, by the design parameters X1 and X2, a difference between a value S(E) of the new search indicator at the point E and a value S(E+Δd) of the new search indicator at a point apart by Δd in the direction from the design center to the point E is used for the objective function F, and the objective function F is maximized.

Thus, it is expected that the search is carried out in the direction from the design center to the point E at least near the point E.

In this example, the new search indicator S is represented as $\Sigma_j a_j T_j (x)$. Incidentally, the value at the point x is represented as Tj (x) for the search indicator j. In addition, $\Sigma_j a_j^2 = 1$ is satisfied.

Here, the objective function F is represented as follows:

$$F = S(E) - S(E + \Delta d) = \sum_j a_j (T_j(E) - T_j(E + \Delta d)) = \sum_j a_j c_j$$

$$c_j = T_j(E) - T_j(E + \Delta d)$$

Figure 22:
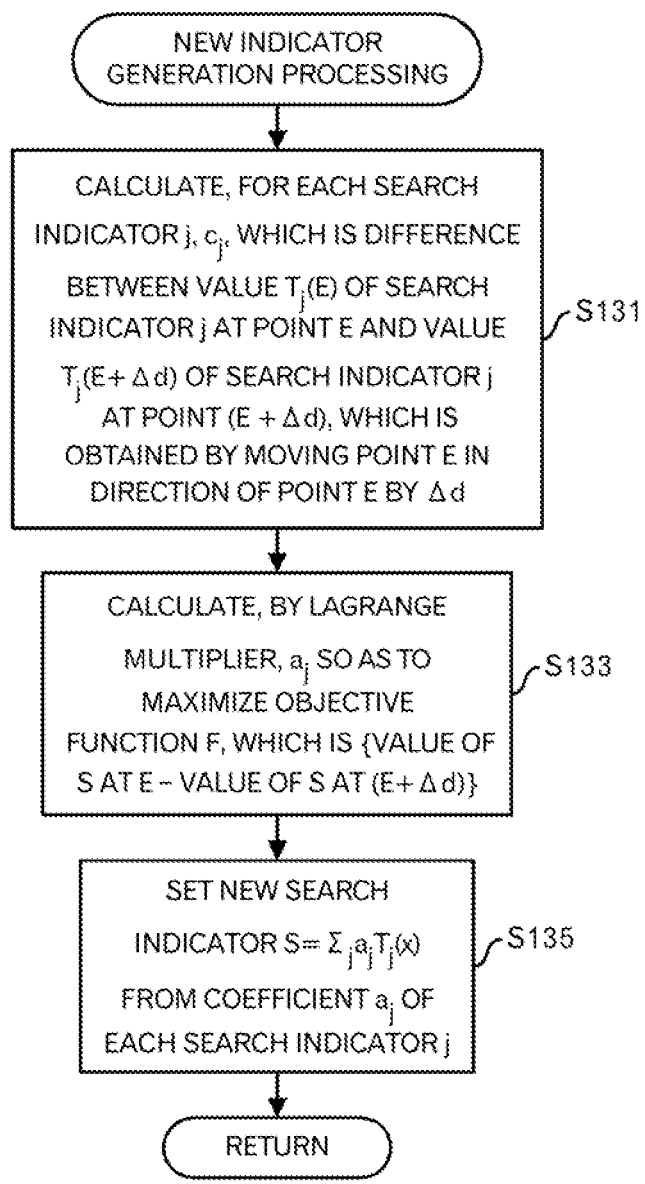
FIG. 22 is a diagram to explain a processing flow of the fourth new indicator generation processing.

Then, the search indicator generator 108 calculates, for each search indicator j, a difference cj between a value Tj (E) of the search indicator j at the point E and a value Tj (E+Δd) of the search indicator j at the point (E+Δd), which is obtained by moving the point E by Δd in the direction from the design center to the point E, and stores the calculated data into the storage device such as the main memory (FIG. 22: step S131).

Then, the search indicator generator 108 calculates aj, which maximizes the aforementioned objective function F, by using Lagrange multiplier, and stores aj into the storage device such as the main memory (step S133).

Specifically, an equation is transformed as follows:

$$L(a, \lambda) = S(E) - S(E + \Delta d) - \lambda \left( \sum_j a_j^2 - 1 \right) = \sum_j a_j c_j - \lambda \left( \sum_j a_j^2 - 1 \right)$$

$$\frac{\partial L}{\partial a_j} = c_j - 2\lambda a_j = 0$$

$$\therefore a_j = \frac{c_j}{2\lambda}$$

Then, because $\Sigma_j a_j^2 = 1$ is satisfied, λ is represented as follows:

$$\lambda = \frac{\sqrt{\sum_j c_j^2}}{2}$$

Therefore, finally, aj is calculated as follows:

$$a_j = \frac{c_j}{\sqrt{\sum_j c_j^2}}$$

After that, the search indicator generator 108 sets the new search indicator $S = \Sigma_j a_j * T_j(x)$ from the coefficients aj of each search indicator j, and stores data of the new search indicator into the storage device such as the main memory (step S135).

Thus, the new search indicator S is generated, by which it is expected that the search is carried out in the direction of the point E, because the slope becomes greater in the direction of the point E near the point E.

Although the embodiments of this technique are explained, this technique is not limited to those embodiments. For example, the functional block diagram illustrated in FIG. 3 is a mere example, and the functional block diagram does not always correspond to the actual program module configuration.

In addition, as for the processing flow, as long as the processing result does not change, a processing order may be changed, and the steps may be executed in parallel. The search for each search indicator j may be executed in parallel, if the resource is remained.

In addition, as for the aforementioned new search indicator generation processing, an example that any one method is carried out was explained. However, plural methods of the new search indicator generation processing may be carried out, and plural search indicators may be generated once. In such a case, at the step S57, plural search results Ps are obtained, and in case of Ps=E for at least one of search indicators, the processing returns to the step S43 through the terminal D. On the other hand, when Ps=E is not satisfied for all of the search indicators, the processing returns to the step S55.

Figure 23:
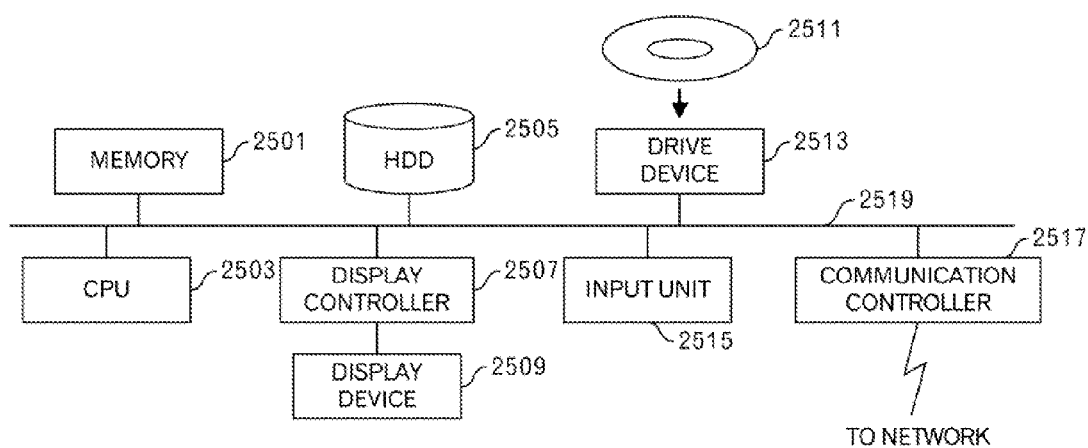
FIG. 23 is a functional block diagram of a computer.

In addition, the optimization processing apparatus 100 is a computer device as shown in FIG. 23. That is, a memory 2501 (storage device), a CPU 2503 (processor), a hard disk drive (HDD) 2505, a display controller 2507 connected to a display device 2509, a drive device 2513 for a removable disk 2511, an input device 2515, and a communication controller 2517 for connection with a network are connected through a bus 2519 as shown in FIG. 23. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform necessary operations. Besides, intermediate processing data is stored in the memory 2501, and if necessary, it is stored in the HDD 2505. In this embodiment of this invention, the application program to realize the aforementioned functions is stored in the computer-readable removable disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application programs systematically cooperate with each other, so that various functions as described above in details are realized.

The aforementioned embodiments are outlined as follows:

An optimization processing method relating to the embodiments includes: (A) upon detecting that a point that satisfies a predetermined condition and whose distance from a predetermined reference point is shorter than a distance from the predetermined reference point to a first point obtained by searching a parameter space based on values of a first search indicator registered in a search indicator storage unit under a first constraint exists in the parameter space, calculating a second point under the first constraint in the parameter space by a search method other than the searching using the first search indicator, and storing data of the second point into a data storage unit; and (B) carrying out a first processing comprising generating a second search indicator represented by a linear combination of at least certain of first search indicator so as to obtain the second point that is stored in the data storage unit or an adjacent point of the second point, when search is carried out by using the second search indicator or generating a second search indicator represented by a linear combination of at least certain of first search indicator so that search is carried out in a direction of the second point when the second search indicator is used, and additionally registering the second search indicator into the search indicator storage unit.

By executing such a processing, when carrying out the next search, it is possible to obtain a new search indicator having high possibility that an optimum solution can be obtained under a different constraint.

Incidentally, the aforementioned carrying out may include: (B1) determining coefficients in the first linear combination so that a linear combination of feature vectors of the first search indictors or a linear combination of first vectors that are certain of the feature vectors is parallel to a second vector representing the second point or a third vector, which is obtained by projecting the second vector to a partial space mapped by the first vectors; and (B2) generating the second search indicator by linearly combining the first search indicators with the corresponding determined coefficients. By using such vectors, it becomes possible to obtain the second search indicator to obtain the second point or an adjacent point of the second point, when search is carried out by using the second search indicator or the second search indicator so that search is carried out in a direction of the second point when the second search indicator is used.

Furthermore, the aforementioned carrying out may include: (B3) determining coefficients in the second search indicator represented by a linear combination of the first search indicators so as to maximize an objective function regarding a difference between a slope to the first point by the second search indicator and a slope to the second point by the second search indicator or an objective function regarding value change of the second search indicator in the direction of the second point at adjacent points of the second point; and (B4) generating the second search indicator by linearly combining the first search indicators with the corresponding determined coefficients, and additionally registering the second search indicator into the search indicator storage unit. Thus, by appropriately setting the objective function, it becomes possible to obtain the second search indicator to obtain the second point or an adjacent point of the second point, when search is carried out by using the second search indicator or the second search indicator so that search is carried out in a direction of the second point when the second search indicator is used. Incidentally, it is also possible to carry out the method of the objective function in addition to the method of the vectors.

In addition, the aforementioned determining may include: removing a feature vector whose relating search route for the first search indicators does not satisfy a first reference or a feature vector whose relating vector used in the generating does not satisfy a second reference, from the feature vectors. It is possible to use various feature vectors. However, when the feature vector which is not suitable for the search indicator in the parameter space is calculated, it is removed in order to avoid the bad influence to the new search indicator. Incidentally, the linear independency is separately secured in order to linearly combine the search indicators.

The optimization processing method relating to the embodiments may further include: (C) determining whether or not the second point can be obtained by second searching the parameter space based on values of the second search indicator registered in the search indicator storage unit; and (D) upon detecting that the second point cannot be obtained by second searching, using the second search indicator as the first search indicator to carry out the carrying out. When the second search indicator that does not reach the target is generated, the second search indicator is additionally generated.

In addition, the aforementioned calculating may include: randomly generating third points around a fourth point that is one first point whose distance with the predetermined reference point is shortest and which satisfies the predetermined condition among first points; and determining whether or not the distance from the predetermined reference point to one third point whose distance with the predetermined reference point is shortest and which satisfies the predetermined condition is shorter than a distance from the predetermined reference point to the fourth point. By such a simple method, it is confirmed whether or not another point that is more favorable than the first point exists.

Furthermore, the optimization processing method relating to the embodiments may further include: (E) calculating a point whose distance with the predetermined reference point is shortest and which satisfies the predetermined condition by searching the parameter space based on values of the first search indicator and values of the second search indicator under a second constraint. The search is carried out, by using the second search indicator, for the second constraint that is another constraint, and it is expected that the optimum point can be obtained by this search.

Moreover, the aforementioned carrying out may include: generating the second search indicator by a plurality of methods or generating the second search indicator for each divided area included in the parameter space. This is to generate more favorable search indicator.

Incidentally, it is possible to create a program causing a computer to execute the aforementioned processing, and such a program is stored in a computer readable storage medium or storage device such as a flexible disk, CD-ROM, DVD-ROM, magneto-optic disk, a semiconductor memory, and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A computer-readable, non-transitory storage medium storing a program for causing a computer to execute a procedure, the procedure comprising:

upon detecting that a point that satisfies a predetermined condition and whose distance from a predetermined reference point is shorter than a distance from the predetermined reference point to a first point obtained by searching a parameter space based on values of a first search indicator registered in a search indicator storage unit under a first constraint exists in the parameter space, calculating a second point under the first constraint in the parameter space by a search method other than the searching using the first search indicator; and carrying out a first processing comprising generating a second search indicator represented by a first linear combination of at least certain of first search indicators registered in the search indicator storage unit so as to obtain the second point or an adjacent point of the second point, when search is carried out by using the second search indicator or generating a second search indicator represented by the first linear combination of at least certain of the first search indicators registered in the search indicator storage unit so that search is carried out in a direction of the second point when the second search indicator is used, and additionally registering the second search indicator into the search indicator storage unit.

2. The computer-readable, non-transitory storage medium as set forth in claim 1, wherein the carrying out comprises:

determining coefficients in the first linear combination so that a linear combination of feature vectors of the first search indictors or a linear combination of first vectors that are certain of the feature vectors is parallel to a second vector representing the second point or a third vector, which is obtained by projecting the second vector to a partial space mapped by the first vectors; and generating the second search indicator by linearly combining the first search indicators with the corresponding determined coefficients.

3. The computer-readable, non-transitory storage medium as set forth in claim 1, wherein the carrying out comprises:

determining coefficients in the second search indicator represented by a linear combination of the first search indicators so as to maximize an objective function regarding a difference between a slope to the first point by the second search indicator and a slope to the second point by the second search indicator or an objective function regarding value change of the second search indicator in the direction of the second point at adjacent points of the second point; and generating the second search indicator by linearly combining the first search indicators with the corresponding determined coefficients.

4. The computer-readable, non-transitory storage medium as set forth in claim 2, wherein the determining comprises:

removing a feature vector whose relating search route for the first search indicators does not satisfy a first reference or a feature vector whose relating vector used in the generating does not satisfy a second reference, from the feature vectors.

5. The computer-readable, non-transitory storage medium as set forth in claim 1, further comprising:

determining whether or not the second point can be obtained by second searching the parameter space based on values of the second search indicator registered in the search indicator storage unit; and upon detecting that the second point cannot be obtained by second searching, using the second search indicator as the first search indicator to carry out the carrying out.

6. The computer-readable, non-transitory storage medium as set forth in claim 1, wherein the calculating comprises:

randomly generating third points around a fourth point that is one first point whose distance with the predetermined reference point is shortest and which satisfies the predetermined condition among first points; and determining whether or not the distance from the predetermined reference point to one third point whose distance with the predetermined reference point is shortest and which satisfies the predetermined condition is shorter than a distance from the predetermined reference point to the fourth point.

7. The computer-readable, non-transitory storage medium as set forth in claim 1, further comprising:

calculating a point whose distance with the predetermined reference point is shortest and which satisfies the predetermined condition by searching the parameter space based on values of the first search indicator and values of the second search indicator under a second constraint.

8. The computer-readable, non-transitory storage medium as set forth in claim 1, wherein the carrying out comprises:

generating the second search indicator by a plurality of methods or generating the second search indicator for each divided area included in the parameter space.

9. An optimization method comprising:

upon detecting that a point that satisfies a predetermined condition and whose distance from a predetermined reference point is shorter than a distance from the predetermined reference point to a first point obtained by searching a parameter space based on values of a first search indicator registered in a search indicator storage unit under a first constraint exists in the parameter space, calculating, by a computer, a second point under the first constraint in the parameter space by a search method other than the searching using the first search indicator; and carrying out, by the computer, a first processing comprising generating a second search indicator represented by a first linear combination of at least certain of first search indicators registered in the search indicator storage unit so as to obtain the second point or an adjacent point of the second point, when search is carried out by using the second search indicator or generating a second search indicator represented by the first linear combination of at least certain of the first search indicators registered in the search indicator storage unit so that search is carried out in a direction of the second point when the second search indicator is used, and additionally registering the second search indicator into the search indicator storage unit.

10. An optimization processing apparatus comprising:

a search indicator storage unit storing first search indicators;

a search processing unit that is responsive to that a point that satisfies a predetermined condition and whose distance from a predetermined reference point is shorter than a distance from the predetermined reference point to a first point obtained by searching a parameter space based on values of a first search indicator registered in the search indicator storage unit under a first constraint exists in the parameter space, and calculates a second point under the first constraint in the parameter space by a search method other than the searching using the first search indicator; and a search indicator generator that carries out a first processing comprising generating a second search indicator represented by a first linear combination of at least certain of first search indicators registered in the search indicator storage unit so as to obtain the second point or an adjacent point of the second point, when search is carried out by using the second search indicator or generating a second search indicator represented by the first linear combination of at least certain of the first search indicators registered in the search indicator storage unit so that search is carried out in a direction of the second point when the second search indicator is used, and additionally registers the second search indicator into the search indicator storage unit.

* * * * *